US006962129B1

(12) United States Patent
Lawson

(10) Patent No.: US 6,962,129 B1
(45) Date of Patent: Nov. 8, 2005

(54) CLUMPING COMPACTED BICARB LITTER

(75) Inventor: Frederick William Lawson, Somerset, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 63 days.

(21) Appl. No.: 10/892,993

(22) Filed: Jul. 16, 2004

(51) Int. Cl.$^7$ ............................................ A01K 29/00
(52) U.S. Cl. .................................................... 119/173
(58) Field of Search ........................ 119/173, 171, 172

(56) References Cited

U.S. PATENT DOCUMENTS

| | | | |
|---|---|---|---|
| 3,765,371 A | 10/1973 | Fisher | 119/1 |
| 4,275,684 A | 6/1981 | Kramer et al. | 119/1 |
| 4,315,761 A | 2/1982 | Larrson et al. | 71/21 |
| 4,395,357 A | 7/1983 | Kramer et al. | 252/428 |
| 4,494,481 A | 1/1985 | Rodriguez | 119/1 |
| 4,570,573 A | 2/1986 | Lohman | 119/1 |
| 4,607,594 A * | 8/1986 | Thacker | 119/172 |
| 4,638,763 A | 1/1987 | Greenberg | 119/1 |
| 4,641,605 A * | 2/1987 | Gordon | 119/173 |
| 4,685,420 A | 8/1987 | Stuart | 119/1 |
| 5,000,115 A | 3/1991 | Hughes | 119/173 |
| 5,143,023 A * | 9/1992 | Kuhns | 119/173 |
| 5,176,107 A * | 1/1993 | Buschur | 119/173 |
| 5,295,456 A | 3/1994 | Lawson | 119/172 |
| 5,303,676 A | 4/1994 | Lawson | 119/173 |
| 5,421,291 A * | 6/1995 | Lawson et al. | 119/173 |
| 6,019,063 A * | 2/2000 | Haubensak et al. | 119/173 |
| 6,029,603 A * | 2/2000 | Evans et al. | 119/171 |
| 6,039,004 A * | 3/2000 | Goss et al. | 119/172 |
| 6,089,189 A * | 7/2000 | Goss et al. | 119/173 |
| 6,206,947 B1 * | 3/2001 | Evans et al. | 71/63 |
| 6,253,710 B1 * | 7/2001 | Ward et al. | 119/171 |
| 2004/0112297 A1 * | 6/2004 | Rasner et al. | 119/172 |
| 2004/0219396 A1 * | 11/2004 | Criado et al. | 428/702 |

* cited by examiner

*Primary Examiner*—Yvonne R. Abbott
(74) *Attorney, Agent, or Firm*—Stephen B. Shear

(57) ABSTRACT

An animal litter composition comprising a particulate, water-absorbent clayey component such as bentonite and a solid particulate compacted sodium bicarbonate.

9 Claims, No Drawings

US 6,962,129 B1

CLUMPING COMPACTED BICARB LITTER

FIELD OF THE INVENTION

The present invention relates to an improved absorbent composition for animal dross and its method of use. More particularly, the present invention relates to an improved composition comprising a water-swellable bentonite clay, such as sodium bentonite or calcium bentonite and compacted sodium bicarbonate. A composition of discrete particles of the water-swellable bentonite clay and discrete particles of compacted sodium bicarbonate effectively absorb animal dross and simultaneously agglomerate into a sufficiently large and stable mass, such that the wetted mass of absorbent composition can be separated from unwetted particles of the composition and removed from a litter box. Consequently, odors emanating from the litter box are reduced or eliminated, and cost savings are achieved because the contents of the litter box, including both the soiled and the unsoiled absorbent composition, do not have to be discarded on a periodic basis.

BACKGROUND OF THE INVENTION AND PRIOR ART

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces. After a relatively short period of time, the dross-soiled absorbent emits objectionable odors because of the presence of the urine and fecal matter.

In order to reduce or eliminate these objectionable odors, homeowners periodically physically remove the fecal matter from the litter absorbent. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time account for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, adsorbing the liquid dross on its surface. For each absorbent material, offensive odors are eventually caused by the absorbed urine, and the entire contents of the litter box, including soiled absorbent material and unsoiled absorbent material, has to be discarded.

An improved composition for animal litters are the clayey soils or comminuted rocks, e.g. the sodium bentonites, comprising at least one water-swellable clay mineral in the montmorillonite clay family. These materials have the ability to clump and harden after contact with an aqueous liquid such as urine. This facilitates the removal of only the soiled portion of the litter in a litter box or cage during cleaning without the necessity of removing all the litter.

With regard to the odor problem connected with the use of animal litters, various deodorizing agents have been recommended for use in such litters, including sodium bicarbonate (SBC). However, when SBC is utilized in the form of an unmodified powder as a deodorizing agent in animal litter and is exposed to the aqueous phase of any animal waste product, the aqueous phase tends to wick across the surface of the animal litter. Furthermore, due to its relatively high density, it tends to sink to the bottom of any litter composition present in the cage or litter box. To overcome these disadvantages, it has been proposed that the SBC be utilized in the animal litter in encapsulated form. However, the preparation of encapsulated SBC is an expensive procedure which renders the employment of SBC in this form impractical for many applications.

The following prior art references illustrate aspects of the technology of animal litter preparation, and, in particular, disclose the use of clays in such litters.

U.S. Pat. No. 3,765,371 issued Oct. 16, 1973 to Fisher, discloses a foamed plastic for absorbing and/or adsorbing animal waste products and also identifies clay and bentonites as previously used animal litters.

U.S. Pat. No. 4,275,684 issued Jun. 30, 1981 and U.S. Pat. No. 4,395,357 issued Jul. 26, 1983 to Kramer et al., disclose calcium silicate as an animal litter box absorbent material, and state that clay minerals, e.g. sepiolites, are known litters.

U.S. Pat. No. 4,315,761 issued Feb. 16, 1982 to Larrson et al., teaches the use of aerated or foamed concrete to absorb animal waste products and facilitate the removal of excrement from a litter box, and also discloses that "porous granulates of burnt expanded clay" are known for use as a urine absorbent.

U.S. Pat. No. 4,494,481 issued Jan. 22, 1985 to Rodriguez et al., discloses the addition of a soluble salt of a transition metal from Group Ib or IIb of the Periodic Table to a conventional litter composition to prevent the development of urine odors, and also identifies "clay such as . . . montmorillonites or bentonites" as suitable for use as an animal litter.

U.S. Pat. No. 4,570,573 issued Feb. 18, 1986 to Lohman, discloses an animal litter composition containing 60–94 wt. % of paper, 1–35 wt. % of gypsum, and 3–12% of water, and also states that clay, fuller's earth, and vermiculite are employed in cat litter compositions.

U.S. Pat. No. 4,638,763 issued Jan. 27, 1987 to Greenberg, teaches the addition of sodium sulfate to a litter box absorbent material to facilitate removal of solid absorbent material from the litter box, and teaches that clays such as montmorillonite and hectorite are suitable as absorbent material.

U.S. Pat. No. 4,685,420 issued Aug. 11, 1987 to Stuart, discloses an animal litter composition comprising a water-absorbing polymer such as a polyacrylate combined with a porous inert solid substrate such as clay.

U.S. Pat. No. 5,000,115 issued Mar. 19, 1991 to Hughes, discloses the use of a water-swellable bentonite clay as an absorbent litter material. The clay absorbs the liquids in animal waste which on contacting the clay agglomerates it into a stable mass easily separated from the unwetted and unsoiled portion of the composition.

Commonly assigned U.S. Pat. No. 5,295,456, issued Mar. 22, 1994, discloses a deodorizing agglomerated sodium bicarbonate additive which may be used in swellable bentonite clay litter compositions. The additive comprises sodium bicarbonate particles which are substantially coated with a mineral oil, and then blended with a powdered siliceous material, e.g., expanded perlite, having a bulk density significantly lower than the density of sodium bicarbonate. The oil-coated particles of bicarbonate are stably adhered to and agglomerated with the particles of the siliceous material.

Commonly assigned U.S. Pat. No. 5,303,676, issued Apr. 19, 1994 to Lawson, also discloses animal litter compositions containing a water-swellable clay and a deodorizing agglomerated sodium bicarbonate component.

The present assignee has marketed under the Arm & Hammer® brand an animal litter comprised of a "non-clumping" clay and a small amount of a compacted sodium bicarbonate. Traditional clay litter is of a larger particle size than the clumping or scoopable clays, and granular sodium bicarbonate segregated from the product. The use of the compacted bicarbonate improved the product homogeneity and reduced product segregation.

DETAILED DESCRIPTION OF THE INVENTION

As stated, the water-absorbent clayey component of the animal litters of this invention may be, for example, a clayey soil or comminuted rock containing at least one water-swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clayey component in the animal litter to agglomerate thus facilitating the removal of only that portion of the litter which is swelled by urine or other aqueous waste liquid.

The preferred clayey component of the animal litter of the invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the animal dross absorbent compositions of the present invention include any water-swellable bentonite clay that hydrates in the presence of water, e.g., swells in the presence of water. The water-soluble bentonite clay can be selected from the group consisting of sodium bentonite, potassium bentonite, lithium bentonite, calcium bentonite and magnesium bentonite; or a combination thereof. The bentonite clay can be any member of the dioctahedral or trioctahedral smectite group, or a mixture thereof. Examples include Montmorillonite, Beidellite, Nontronite, Hectorite and Saponite; or combinations thereof. The bentonite clay of the present invention also can be Attapulgite or Sepiolite.

In order to achieve the full advantage of the present invention, regardless of the water-swellable bentonite that is used in the litter box absorbent composition, it is preferred that the bentonite clay not be calcined. Calcination results in a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

In accordance with another feature of the present invention, a water-swellable bentonite clay useful in a litter box absorbent composition is present in a particle size ranging from about 50 microns to about 3350 microns in diameter, and more preferably in a particle size ranging from about 600 to about 3350 microns in diameter; or, in other words, in a particle size of from about a 6 mesh to about 100 mesh. It has been found that water-swellable bentonite particles appreciably greater than about 3350 microns in diameter do not sufficiently cohesively agglomerate to allow facile physical separation of the wetted, agglomerated mass from the litter box. Furthermore, it has been found that water-swellable bentonite particles appreciably smaller than about 50 microns in diameter produce a litter box absorbent composition that is too dusty. However, in order to achieve the full advantage of the present invention, the water-swellable bentonite clay should be present in the composition in particle sizes across the entire range of about 600 to about 3350 microns because the smaller diameter water-swellable bentonite particles, upon being wetted, swell and serve as "bridges" between larger, wetted bentonite particles. The overall effect is the production of a sufficiently large wetted mass with excellent physical cohesive strength.

In general, any commercial grade of sodium bicarbonate (SBC) may be used in preparing the compacted SBC component in the compositions of this invention. Thus, the particles of SBC may initially be within the range of about 40 to 1,000 microns, preferably about 100 to 400 microns, and may have an SBC purity of at least about 90, preferably at least about 99 wt. %.

The powdered SBC is compacted into sheets and then broken into granules. Particle sizes of the compacted SBC for use with the litter composition of this invention range from about 600 to 3,300 microns. At this size, the SBC is of a comparable size to that of the bentonite clay and, accordingly, there is little, if any, segregation of the clay and SBC particles. A useful compacted SBC can be obtained from Stellar Manufacturing Co., Sauget, Ill. The litter compositions of this invention contain about 0.1 to 20 wt. % of the compacted SBC and 80 to 99.9 wt. % of the swellable clay. Ranges of compacted SBC in the composition of this invention of about 0.5 to 2.5 wt. %, and, in particular, about 2.0 wt. % are also applicable.

The compositions may also optionally contain a fragrance component. This may be a powdery "fragrance preblend" comprising a pleasant smelling oily liquid or "perfume oil" absorbed on particles of a fragrance carrier having a high surface to volume ratio. The perfume oil may comprise one or more essential or synthetic oils which are well-known in the art as providing a pleasant odor to the composition containing them and also as having the capability of somewhat masking unpleasant odors. The fragrance carrier may be any of a group of siliceous and other materials also well-known in the art as having a high surface to volume ratio and as being able to absorb perfume oils efficiently while maintaining their powdery consistency, e.g., dimorphous silicas or starches.

If a fragrance is utilized in the deodorizing additive, a fragrance preblend may be separately prepared, e.g., by adding a portion of the fragrance carrier to a mixer, initiating spraying of the perfume oil into the mixer while the remainder of the fragrance carrier is added, and continuing blending until a lump-free consistent powder is obtained. The blending period for preparation of the fragrance preblend may be, for example, about 10 to 60 min.

The perfume oil may be present in the fragrance preblend in an amount, for example, of about 25 to 75 wt. % based on the total weight of preblend, and the particle size of fragrance carrier and preblend may be in the range, for example, of 100 to 400 U.S. mesh size. The fragrance preblend may be blended into the litter composition and may be present in the final litter composition in an amount, for example, of about 0.05 to 3.0 wt. % based on the weight of the total composition.

The fragrance may also be utilized in encapsulated form or as a spray dried component.

The foregoing blending procedures may be carried out in any conventional equipment intended for the blending of a particulate solid material with other solid materials or liquids. Examples of suitable equipment are ribbon blenders, V-shell blenders, Marion mixers, Norda mixers, and continuous mixing ribbon screw conveyors.

The litter compositions of this invention may be used for a wide variety of animals and birds, e.g., uncaged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons.

In addition to the deodorizing additive component described previously, the litter composition of this invention may contain other components for various purposes, e.g., disinfectants and colorants.

The compositions of this invention are particularly suitable for use as cat litters.

The invention is further illustrated by the following example of a preferred embodiment. All parts are by weight.

EXAMPLE

The following composition was prepared for use as a cat litter.

| Ingredient | % |
|---|---|
| Sodium bentonite clay | 97.9 |
| Compacted bicarb | 2.0 |
| Fragrance | 0.1 |

The sodium bentonite clay was composed of particles with a size of from 420 microns to 2000 microns. The compacted bicarb particles ranged in size from 600 microns to 2360 microns. Although the compacted bicarb particles were somewhat larger in size than the clay particles, the size differential was such that the clay and bicarb did not segregate during shipment. However, the compacted bicarb particles were sufficiently larger in size than the clay particles to enhance their visual presence in the litter blend, thereby producing an overall desirable appearance for the product.

What is claimed is:

1. An animal litter composition comprising (1) a particulate water-absorbent clayey component containing at least one water-swellable clay mineral and (2) a solid particulate compacted sodium bicarbonate.

2. The litter composition of claim 1 wherein said at least one clay mineral is montmorillonoid or smectite.

3. The litter composition of claim 1 wherein said clay mineral is bentonite.

4. The litter composition of claim 3 wherein said bentonite is a sodium bentonite.

5. The litter composition of claim 1 wherein said clayey component is present in an amount of from about 80 to 99.9 wt. % and said compacted sodium bicarbonate is present in an amount of from about 0.1 to 20 wt. % based on the total composition.

6. The litter composition of claim 5 wherein said clayey component is present in amounts of from 77.5 to 99.5 wt. % and said compacted sodium bicarbonate is present in amounts of from 0.5 to 2.5 wt. %.

7. The litter composition of claim 6 wherein said clayey component is present in amounts of about 98 wt. % and said compacted sodium bicarbonate is present in amounts of about 2 wt. %.

8. The composition of claim 1 wherein said particulate compacted sodium bicarbonate has an individual particle size of about 600 to 3,300 microns.

9. The litter composition of claim 1 also containing a fragrance having the property of at least partially masking unpleasant odors.

* * * * *